United States Patent [19]
Bretz

[11] 3,738,579
[45] June 12, 1973

[54] COMBINATION MANURE LOADER AND SPREADER

[76] Inventor: Robert E. Bretz, R. R. No. 2, Coggon, Iowa

[22] Filed: Dec. 13, 1971

[21] Appl. No.: 207,241

Related U.S. Application Data

[63] Continuation of Ser. No. 73,434, Sept. 18, 1970, abandoned.

[52] U.S. Cl. .............................. 239/651, 239/658
[51] Int. Cl. ........................ A01c 3/06, A01c 7/08
[58] Field of Search ................ 239/651, 658; 37/9; 214/83.26

[56] References Cited
UNITED STATES PATENTS

| | | | |
|---|---|---|---|
| 3,392,922 | 7/1968 | Lindgren | 239/658 |
| 3,095,202 | 6/1963 | Kucera | 239/651 |
| 1,979,945 | 11/1934 | Kranick | 239/651 |
| 2,368,422 | 1/1945 | Oberkamper | 239/651 |
| 2,660,439 | 11/1953 | Scranton | 239/651 |
| 2,755,092 | 7/1956 | Donahoe | 239/651 |
| 3,393,874 | 7/1968 | Buchele | 239/651 |
| 3,195,711 | 7/1965 | Bogdan et al. | 239/651 |
| 3,599,870 | 8/1971 | Brackbill et al. | 239/658 |
| 3,301,566 | 1/1967 | Wood | 239/658 |
| 3,011,793 | 12/1961 | McElhinney et al. | 239/651 |

FOREIGN PATENTS OR APPLICATIONS

| | | | |
|---|---|---|---|
| 205,920 | 10/1959 | Austria | 239/651 |

*Primary Examiner*—Lloyd L. King
*Attorney*—Haven E. Simmons and James C. Nemmers

[57] ABSTRACT

A combination manure loading and spreading machine employs a drum-shaped container, horizontally mounted transversely of the direction of travel of the machine, on a tractor drawn wheeled frame. The drum is movable between lower and upper positions relative to the ground. When in its lower position, a scoop beneath the drum picks up the manure as the machine travels and an assembly of blades revolving concentrically about the drum carries the manure up from the scoop and dumps it into the drum through an upper opening therein. When the drum is later raised to its upper position and the machine driven off to a field, a flail assembly in the drum unloads the manure, both the blade and the flail assemblies being alternately power driven from the tractor.

The flail assembly itself is improved by the provision of a pair of discs adjacent individual flails and spaced inboard from the ends of the flail drive shaft one quarter the length of the latter. The discs are provided with a pair of large notches in their rims and a pair of rigid arms is pivoted adjacent the rim of each disc at diametrically opposite locations, the arms being fitted with short lengths of chain flail. The discs, arms and short flails cut initial paths through the manure in the drum so that the other flails get into operation more quickly and easily.

22 Claims, 11 Drawing Figures

Patented June 12, 1973 3,738,579

INVENTOR.
ROBERT E. BRETZ
BY Havm E. Simmons
ATTORNEY

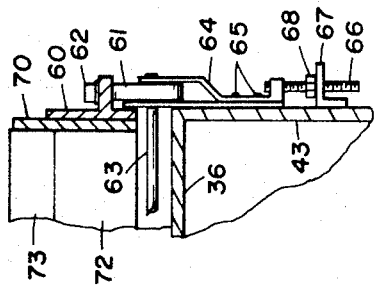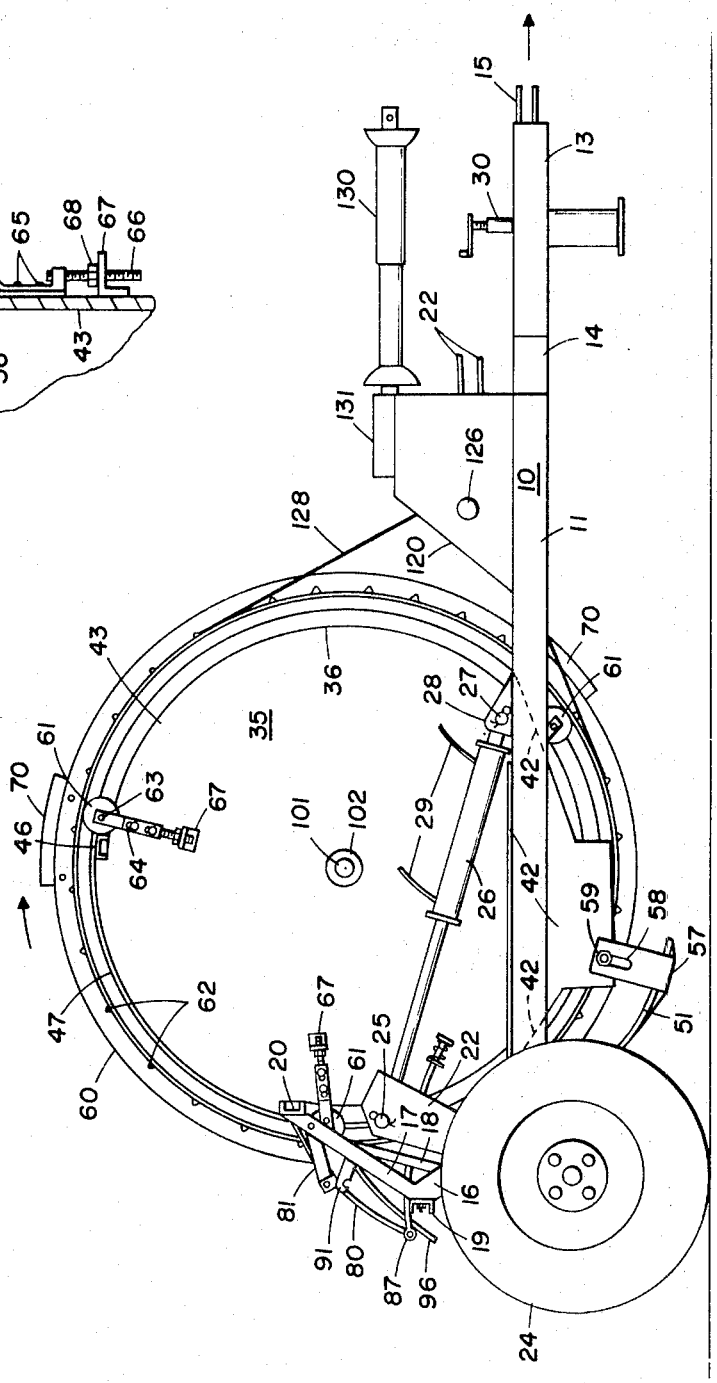

Patented June 12, 1973

INVENTOR.
ROBERT E. BRETZ

BY
ATTORNEY

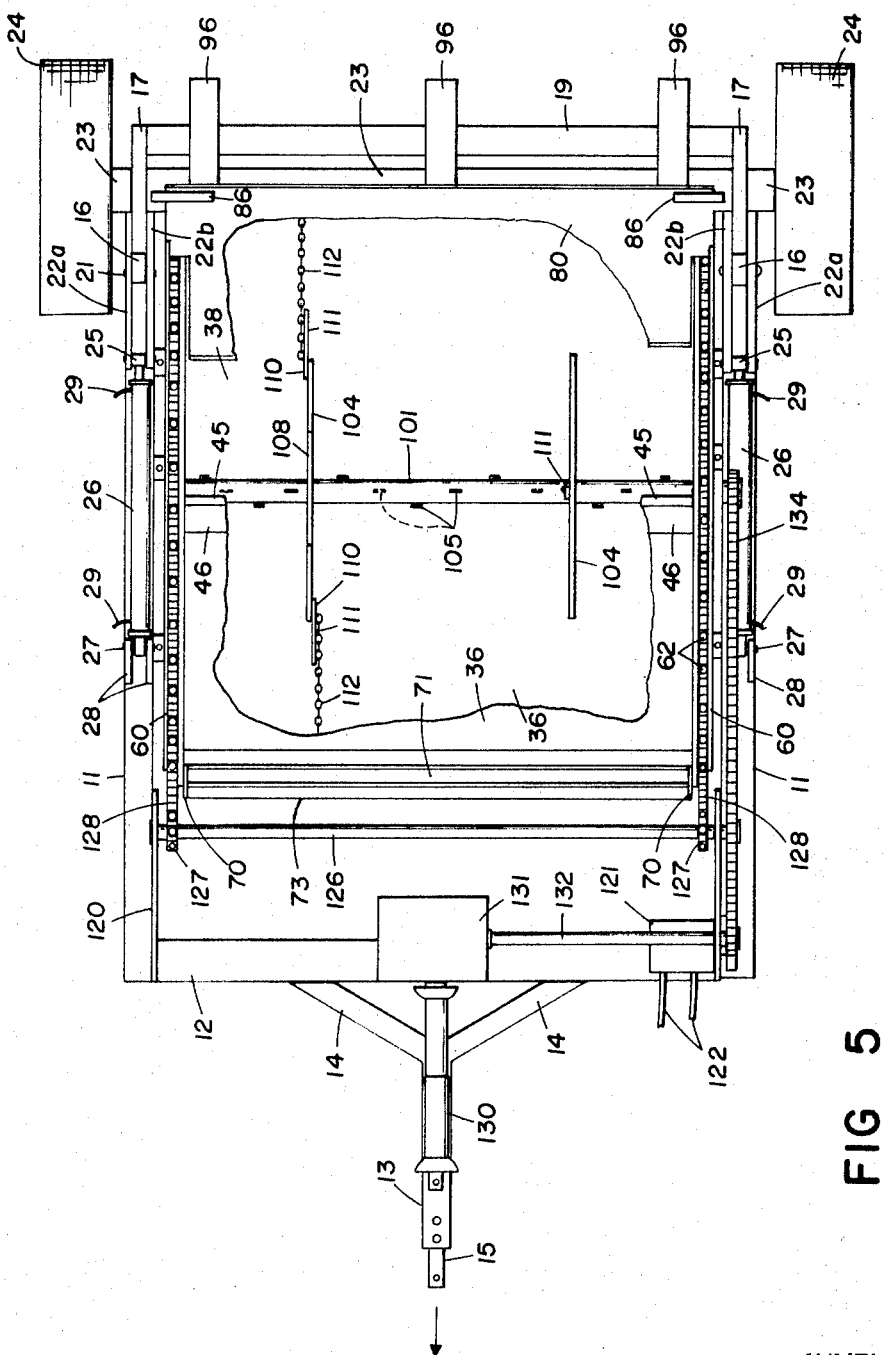

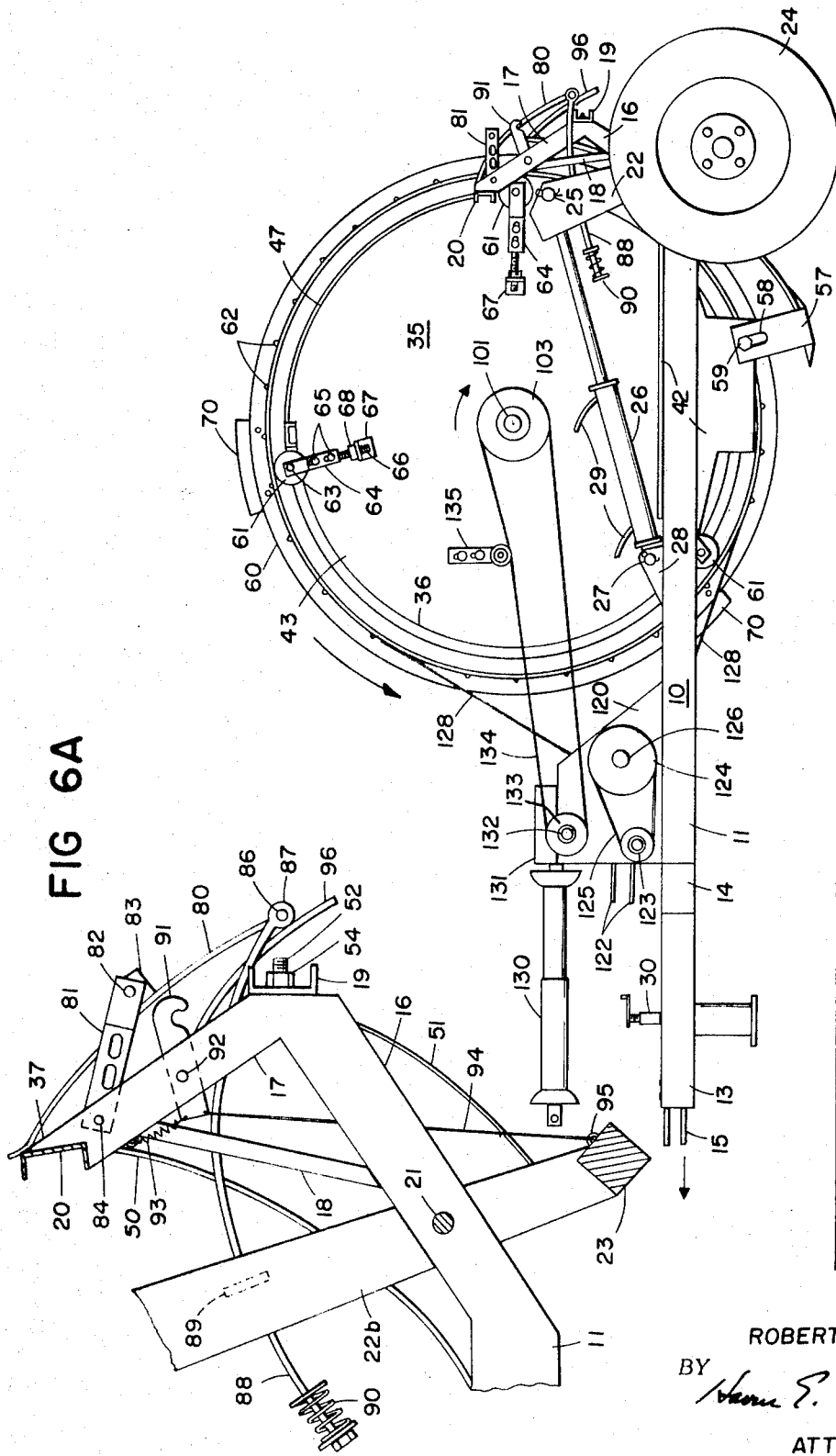

COMBINATION MANURE LOADER AND SPREADER

CROSS REFERENCE TO RELATED APPLICATION

This application is a continuation of application Ser. No. 73,434, filed Sept. 18, 1970.

BACKGROUND OF THE INVENTION

Manure spreaders have been long known in the art. But loading of them is typically a rather primitive task, done sometimes by hand or sometimes, especially in the case of larger cattle feed lots, by a tractor mounted scoop. The latter case of course requires two separate machines, the scoop and the spreader, and usually two tractors. Otherwise a single tractor would have to be shuttled back and forth between the scoop and the spreader. In any event, the operation is unnecessarily slow and cumbersome and, so far as is known (with one possible exception noted hereafter), a single machine which combines the operations of both loading and spreading the manure is not currently being marketed.

The latter is apparently true despite the fact that combination manure loaders and spreaders have been long known in the art, such as those described in U.S. Pat. Nos. 883,243; 1,018,984; 1,101,358; 1,125,122; 1,346,433; 1,979,945; 3,011,793 and 3,393,874. Possibly the reason for the present market unavailability of combined manure loaders and spreaders of the types in the foregoing patents lies in the nature of the manure concerned. Most animal wastes in feed lots are in sloppy or semi-solid form and it is in this form that it must be picked up from the feed lot, transported to a field and there spread about. The machines in all the foregoing patents are really not suitable for holding and carrying sloppy or semi-solid animal wastes, because they tend to leak too much, both when stationary and especially if tilted, as when on an incline or during travel over rough ground. This is particularly true of those which employ elongated, box-like containers for the manure and slat-type conveyors, or in which the manure container itself is deliberately inclined with respect to the ground, as in U.S. Pat. No. 3,393,874.

In order for these machines of the prior art to function without significant leakage or spillage, one must wait until the manure has dried to a much more solid form. But this is not desirable because in its sloppy form the wastes contain the most valuable soil nutrients which are impaired by the drying process and lost from run-off. Besides, run-off increases the chances of pollution of areas surrounding the feed lot. Hence, it is most desirable that the wastes be removed from the feed lot promptly and often and, as explained, this is something the foregoing machines cannot efficiently do. For these reasons, it seems likely, the latter machines are not currently used in feed lots but instead removal and spreading of manure is still typically done by two separate machines or partly by hand, in both cases requiring much time and effort.

The one known exception mentioned above to current practice is the use of a tractor drawn, self-loading scraper-spreader designed for moving dirt, especially in connection with the building of road beds. Such a machine is manufactured by Harris-Stewart-Hoover, Inc. of Oklahoma City, Oklahoma, and it is known as the "Model RS-4 Wheel ROTOHAUL." Some of these machines have been put to use in very large feed lots, two of these in Illinois being described in the May, 1964 issue of Feed Lot magazine and in the December, 1969 issue of Beef magazine. The ROTOHAUL machine employs a large number of vanes incorporated in a reel concentrically rotable about a cylindrical bowl. The reel is not power driven but the vanes engage the ground so that the motion of the machine as it is pulled by a tractor causes the reel to revolve and the vanes sequentially to pick up the dirt cut away by a leveling blade working in conjunction with the vanes. The dirt is carried up around the bowl by the vanes and dumped into the former through an upper opening. When the dirt is later to be spread, the bowl is gradually inverted so that the dirt spills out between the vanes onto the ground, the reel itself again being rotated by contact with the ground to help spread the dirt. The height of the reel and bowl can be adjusted relative to the ground, both for transport purposes and for varying the depth to which the dirt is spread.

The ROTOHAUL machine will load manure in sloppy form without leakage. But its ability to do so is quite limited in several important respects. In the first place, the reel is not positively driven but depends for rotation on forward motion of the machine. It thus does not operate very effectively in or about corners or in small feed lots. In the second place, the leveling blade does not float on the surface of the feed lot which typically is concrete. Instead, the entire weight of the machine is on the leveling blade and the reel. This is necessary when the machine is moving dirt in order to propel the reel but is unnecessary and undesirable in the case of manure because of the consequent wear on the leveling blade and the reel owing to the concrete floor of the feed lot. But it is as a manure spreader that the ROTOHAUL machine is totally ineffective because it cannot "spread" manure in the sense that other manure spreaders do and must. It can dump the manure, but by its innate design, it cannot spread it out over an area larger than that over which the machine travels, whereby the manure is not dispersed as much as it should and must be in order to prevent runoff, pollution and the possibility of burning the next crop from the ground concerned. In the case of the feed lots where the ROTOHAUL machine is used, its inability to spread manure in the accepted sense is not important because there the manure is not used for fertilizing purposes but is merely hauled away and dumped in a storage area.

As stated, therefore, so far as is known, there is no single machine available which will effectively load sloppy, semi-solid animal wastes in a feed lot, carry it away and then spread it out as fertilizer on a field. Accordingly, the chief object of the present invention is to provide a machine which will efficiently and effectively accomplish the foregoing.

SUMMARY OF THE INVENTION

Essentially, the manure loading and spreading machine of the present invention employs a cylindrical drum mounted on a frame, the axis of the drum being horizontally positioned transversely of the direction of travel of the machine. The frame in turn is supported on two rear wheels and at its front on a tractor by which it is drawn. A pair of hydraulic cylinders, supplied from the tractor's hydraulic system, raise and lower the wheels so as to adjust the elevation of the drum above the ground. About the drum is rotably mounted an annular shaped blade assembly carrying three circumferentially spaced blades which rotate concentrically about the exterior of the drum. The blades are parallel to the axis of the drum and pass over a manure loading-unloading opening in the upper rear portion of the peripheral wall of the drum. Just below the path of the blades directly beneath the drum is disposed a forwardly pointing manure scoop. The rear end of the latter is articulated with respect to the frame while its forward end floats on the feed lot floor, when the drum is in its lower or loading position, so that no weight of the machine is bourne either by the scoop or by the blades. The blade assembly is positively driven by a hydraulic motor, also supplied from the tractor's hydraulic system, in a direction such that the blades sequentially engage the manure picked up by the scoop and carry it up around the rear of the drum to the loading-unloading opening at which point the manure falls from the blades into the drum. In order to help retain the manure on the blades until it is deposited in the drum, an arcuate retaining plate extends from the rear of the scoop up around the drum and partially overlies the loading-unloading opening so as to form with the scoop a sort of "duct" through which the manure laden blades pass. When the drum is full, it is raised by the hydraulic cylinders to its upper or "transport and unloading" position so that the scoop is well off the ground, whence it can be driven off to the field for unloading.

The drum is equipped with suitable means for unloading and spreading the manure. While other apparatus could be used for this purpose, the present invention employs a typical flail assembly within the drum. As is well known, this basically consists of a shaft journaled in the end walls of the drum to which are attached the ends of a number of lengths of chain or the like spaced along the shaft and rotating therewith; see, for instance, U.S. Pat. Nos. 2,886,333 and 2,957,698. The shaft is driven from the tractor's power takeoff since considerable torque is needed. As the shaft rotates, once the chain flails have "broken loose" in the manure they gradually work through the latter as they extend further and further radially from the shaft owing to centrifugal force. As they do so they literally fling the manure out through the loading-unloading opening and disperse it over a relatively large area of ground. The overlying manure retaining plate is connected into the drum lowering and and raising mechanism so that as the machine is raised to the unloading position, the plate drops down and away from the opening in order to uncover it fully for discharge of manure. Correspondingly, as the machine thereafter is again lowered to the loading position, the retaining plate automatically returns to its former position.

The present invention also incorporates improvements to the flail assembly itself which not only initially break the chain flails loose in the manure more quickly while reducing the torque required to do so, but which also better spread the manure. These improvements, which are also applicable to manure spreaders per se as well as to the present combination manure loader and spreader, consist of a pair of large diameter discs on the flail assembly shaft spaced inboard from the end walls of the drum a distance equal to one-quarter the length of the shaft. The discs are provided with large notches in their rims at diametrically opposite locations. Chain flails are attached to the shaft close by the two sides of each disc, and each of the latter is fitted with a pair of diametrically opposite rigid arms swingingly pivoted adjacent the rim of the disc on opposite sides of the latter. The notches and the pivots of the pair of arms of one disc are disposed at an angle of ninety degrees with respect to the notches and the pivots of the pair of arms of the other disc, and adjacent the pivot of each arm is attached a short length of chain flail. When the flail assembly is started, the arms are in a position in which they are folded back onto their respective discs with their flails dangling in the manure. The displacements of the discs themselves in the manure and their notches provide initial paths therein for the arms and reduce the required starting torque. Thereupon, the arms and their flails begin to clear paths through the manure for the chain flails attached to the shaft adjacent each side of the discs, and those flails in turn for the ones adjacent them and so forth until all flails are operative, during which time the arms will have gradually swung on their pivots until they and their flails are fully extended radially outward from the discs.

The use of discs or the like and swinging rigid arms pivoted thereto for the purpose of breaking loose the chain flails is basically old in flail type manure spreaders; see U.S. Pat. Nos. 2,866,332 and 3,048,409, for example. But in the latter patent the discs and arms are placed at the extreme ends of the shaft while in the former patent the rigid arms are merely a substitute for chain flails. Furthermore, in the latter patent if the discs were placed at positions intermediate the ends of the shaft, owing to their relatively large diameter they would tend to interfere with loading of the spreader since that is typically done by a tractor mounted scoop. In the present case, however, the positioning of the discs a quarter of the length of the shaft inboard from its ends results in each disc and its arms assisting the chain flails on both sides of the disc instead of on just one side, as in the latter patent. To put it another way, each disc and its arms work axially in both directions over two quarter lengths of shaft instead of in one direction only over a half length of shaft. Obviously, therefore, the flails are thereby more quickly brought into full operation. And since loading of the drum is performed by the rotating blade assembly rather than by a tractor mounted scoop, the discs do not impede the loading function.

As a result of the foregoing, the machine of the present invention will load itself in the feed lot, scraping the surface of the latter clean of animal wastes and liquids without need to wait until they have dried to more solid form and without loss in nutrient value of the manure or from runoff. Since the blade assembly is power driven, the machine can operate efficiently in small lots and in tight corners independently of its forward motion. It will then transport the wastes to a field and there quickly spread them out. All this can be done with a single tractor without the operator ever leaving the tractor seat and without leakage or spillage of the wastes either during loading or thereafter during transport. Consequently, both operator fatigue and particularly the time required to remove and spread a given quantity of manure are greatly reduced. Other features and advantages will be apparent from the following drawings and the more detailed description of the invention set forth thereafter.

BRIEF DESCRIPTION OF THE DRAWINGS

FIG. 1A is an enlarged detail view of a portion of FIG. 1 illustrating the operation of the linkage controlling the manure retaining plate and its position during loading.

FIG. 3 is a detail sectional view taken along the line 3—3 of FIG. 1.

FIG. 5 is a top plan view of the machine of FIG. 1 in its loading position, certain portions being broken away to illustrate the interior of the drum and the flail assembly.

FIG. 6 is a side elevation similar to FIG. 1 but illustrating the machine in its transport-unloading position.

FIG. 6A is an enlarged detail view, similar to FIG. 1A, of a portion of FIG. 6 illustrating the operation of the linkage controlling the manure retaining plate and its position during transport-unloading.

FIG. 7 is an elevational view illustrating the side of the machine opposite that of FIG. 6.

DESCRIPTION OF THE PREFERRED EMBODIMENT

Figure 1:
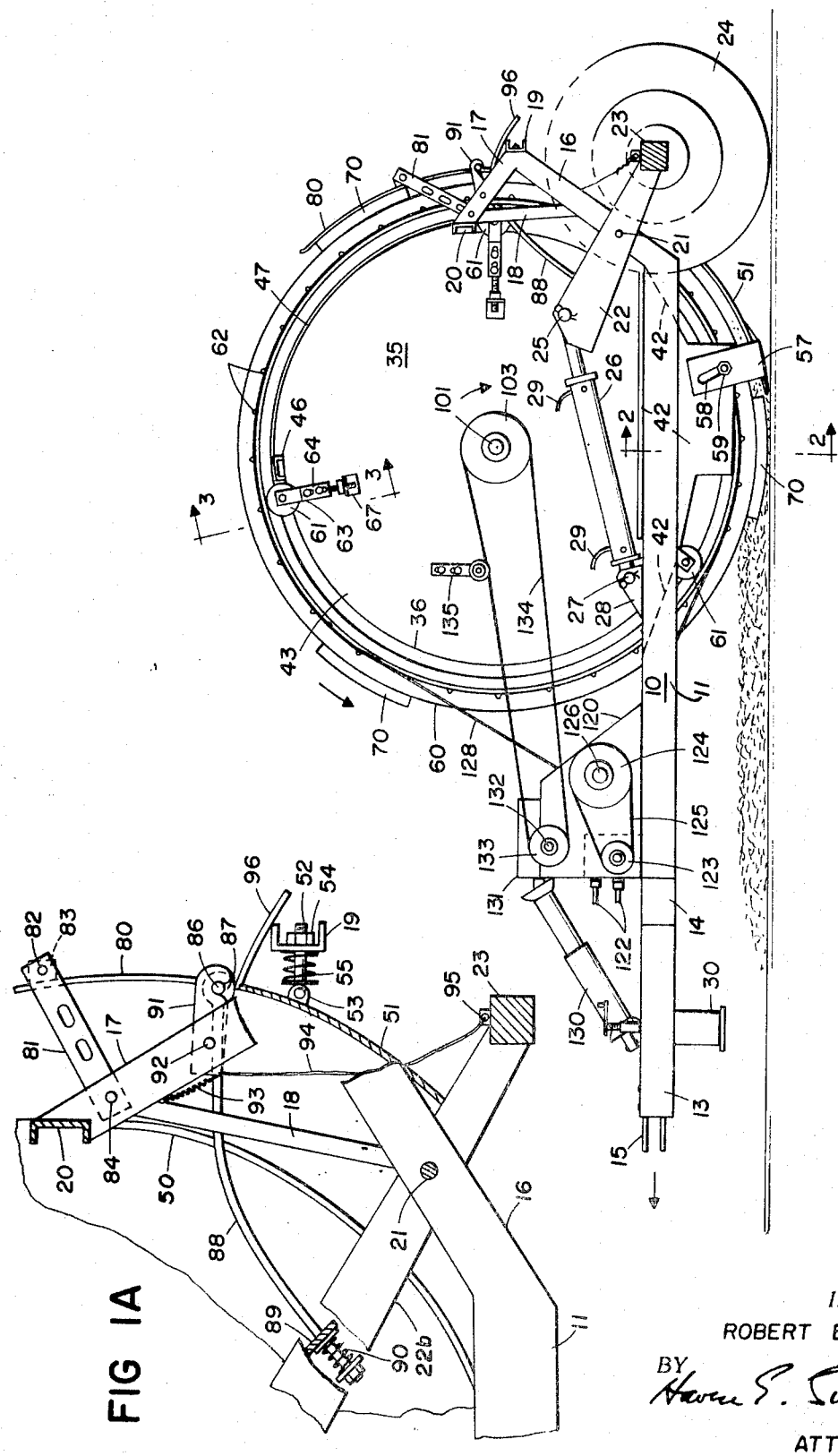
FIG. 1 is a side elevation of a manure loader and spreader according to the present invention illustrating the machine in its loading position.

As already noted, the combined loading and spreading machine of the present invention includes a horizontal frame, generally designated at 10, which consists of spaced side rails 11 of box section joined at their forward ends by a similar cross rail 12. To the latter is centrally attached a tongue 13 braced by beams 14 and fitted at its forward end with a tractor hitch 15. At their after ends the rails 11 are kicked up rearwardly at 16 and then forwardly at 17, each pair of rails 16 and 17 being vertically strengthened by braces 18 therebetween and horizontally joined by channel beams 19 and 20. Intermediate the ends of the rails 16 are horizontally pivoted at 21 the mid-sections of a pair of trailing suspension arms 22, each consisting of a pair of plates 22a, 22b straddling its respective rail 16. The lower ends of arms 22 are joined by an axle beam 23 extending outboard of the arms 22 to whose ends are journaled a pair of relatively large pneumatic tired wheels 24. The upper ends of the suspension arms 22 are hinged at 25 to the pistons of a pair of hydraulic rams 26 whose cylinders are hinged at 27 to cleves 28 atop the rails 11. The rams 26 are activated through hoses 29 connectable into the hydraulic system of a tractor (not shown) when hitched at 15. Accordingly, as will be apparent, activation of the rams 26 will alter the elevation of the frame 10 above the ground. When the rams 26 are fully retracted as shown in FIG. 1, the frame 10 is in its lower position, referred to as the loading position of the machine. When the rams 26 are fully extended as shown in FIG. 6, the frame 10 is in its uppermost position, referred to as the transport-unloading position of the machine. In order to support the forward end of the machine when unhitched, a suitable screw-type jack stand 30 is secured through the tongue 13.

The manure drum 35 sits spacedly between the side rails 11, its axis horizontally and transversely of the normal direction of travel of the machine indicated by the arrows in FIGS. 1, 5, 6, 7 and 8 adjacent the tongue 13. The cross beam 20 lies against the cylindrical drum wall 36 and forms a portion of the lower lip 37 of the drum loading-unloading opening 38 in the upper rear quarter of the wall 36. The drum is supported on three horizontal channel beams 39, 40 and 41 extending between and butt welded at their ends to a pair of scoop mounting plates 42 hung from the rails 11 along their inboard faces (see FIGS. 1, 2, 3, 4 and 7). Each beam 39, 40 and 41 is disposed with its legs against the drum wall 36 and is attached to the adjacent drum end walls 43 by means of angle brackets 44 welded to the latter and bolted to the floor of its respective beam 39, 40 and 41, all as shown in FIG. 2 in the case of the beam 40. Along the upper lip 45 of the loading-unloading opening 38 an additional cross beam 46 similar to cross beam 20 is secured therealong to the drum wall 36, and the drum end walls 43 between the lips 37 and 45 are concentrically extended at 47 up flush with the outer faces of the beams 20 and 46.

The scoop assembly 49 includes fixed and movable scoop plates 50 and 51. The fixed plate 50 is secured over the outer faces of the beams 20, 40 and 41 between the drum end walls 43 concentric with the drum wall 36 (see FIG. 8), its upper end forming the outer edge of the lip 37. The movable plate 51 extends in spaced, generally concentric relation to the fixed plate 48 from a level below the lip 37 down almost directly beneath the lowermost point of the drum wall 36 and is articulately secured adjacent its upper end by means of three eyebolts 52. The latter are hinged to the plate 51 at spaced locations thereacross on a horizontal hinge rod 53, threaded shanks of the bolts 52 passing rearwardly through the cross beam 19 and fitted with nuts 54 on the far side (see FIGS. 1A, 4 and 8). About the shanks of the bolts 52 between the hinge rod 53 and the face of the beam 19 are inserted compressible coil springs 55 so that the spacing between the upper ends of the plates 50 and 51 can resiliently increase for reasons to be later explained. The lower end of the scoop plate 51 is reinforced thereacross for stiffness by any appropriate structures, as indicated at 56 in FIGS. 4 and 8, and is suspended on a pair of vertical brackets 57 fastened at their lower edges to the lateral ends of the plate 51 and provided with vertical slots 58 in which ride headed pins 59 projecting laterally from the outboard faces of the mounting plates 42. The length and position of the slots 58 are such that when the machine is in its loading position the forward end of the scoop plate 51 rests on the ground, as shown in FIG. 1 for example, and will float thereon as the machine proceeds in the direction indicated, but will be lifted well clear of the ground when the machine is in its transport-unloading position as shown in FIG. 6 for example.

The manure pickup assembly, as already noted, consists of a pair of annular members 60, which are generally Tee-shaped in cross section, disposed in concentrically spaced relation about the drum wall 36 at the end walls 43, the "crosses" of the Tees extending perpendicularly between the scoop plates 50 and 51 while the "strokes" thereof project laterally toward the brackets 57. The annular members 60 are suspended for rotation about the wall 36 on three corresponding pairs of rollers 61 engaging the inner peripheral faces of the members 60 whose outer peripheral faces are fitted with suitable driving cogs 62. Each corresponding pair of rollers 61 is journaled on the ends of a horizontal axle 63 extending over the drum wall 36 in the space between the latter and the members 60. The three axles 63 in turn are supported in radially disposed cleves 64 having radially extending slots therein which receive headed bolts 65 in the side walls 43. Each clevis 64 includes a threaded shank 66 at its radially inner end which slides through an angle bracket 67 secured to the end wall 43, the radial position of each clevis 64 being governed by a nut 68 on its shank 66 against the radially outer face of its angle bracket 67 in order to permit adjustment of the members 60 relative to the drum wall 36 and to compensate for wear.

Figures 2, 8:
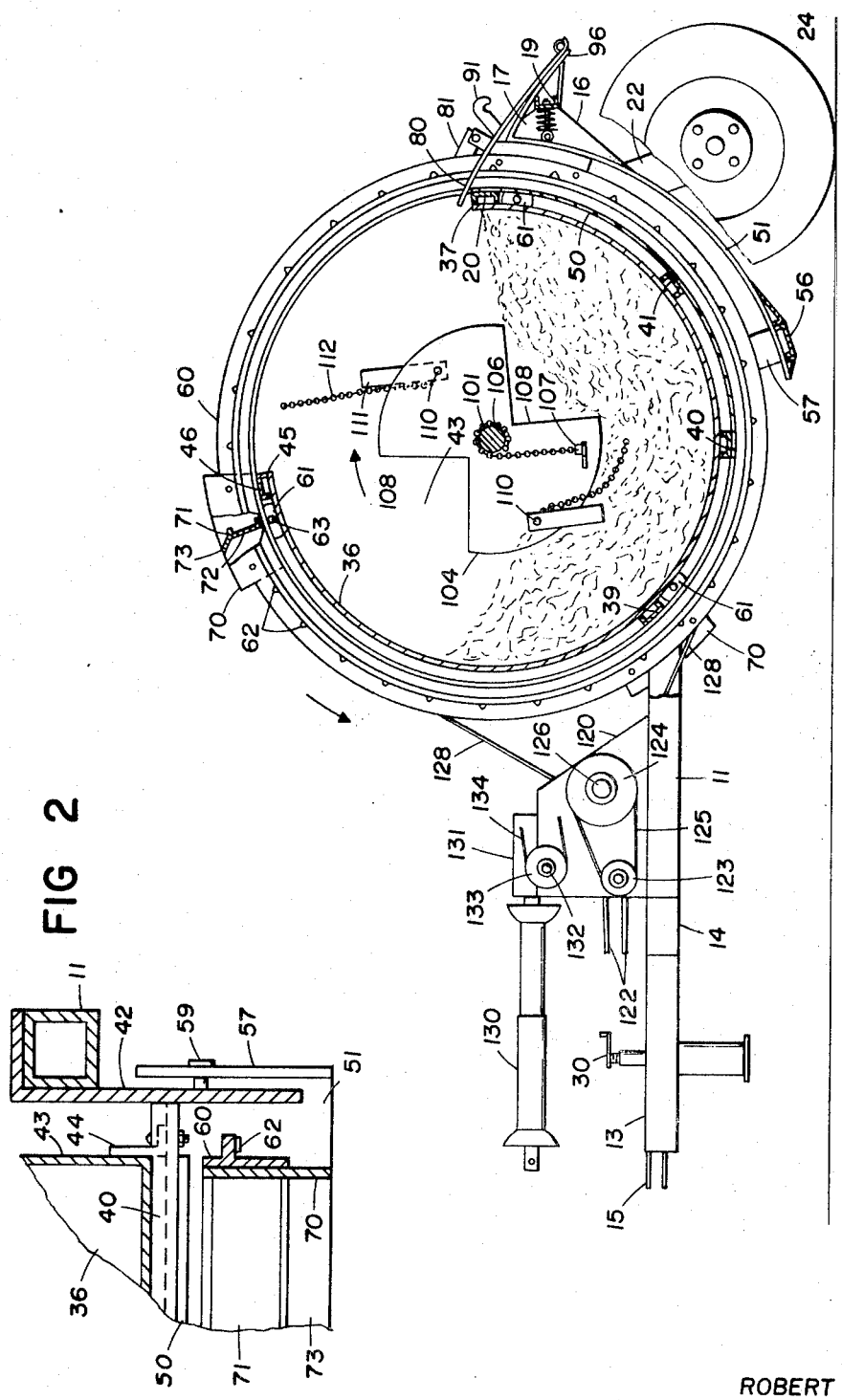
FIG. 2 is a detail sectional view taken along the line 2—2 of FIG. 1.
FIG. 8 is a side elevational view similar to FIG. 6 but with various portions cut away to illustrate certain structural details including the improved flail assembly.

At three equally spaced locations along the opposed inner faces of the annular members 60 are fitted three corresponding pairs of pickup blade end plates 70 extending radially beyond the former and radiused so that their outer edges pass the scoop plate 51 during rotation of the pickup assembly when the machine is in its loading position with the lower end of the scoop plate 51 resting upon the ground. Between each corresponding pair of end plates 70 in turn is butt welded the ends of a pickup blade 71 formed of a channel member disposed parallel to the axis of the drum 35. The wide wall 72 of each channel member faces the direction of rotation of the pickup assembly indicated by the arrows in FIGS. 1, 6, 7 and 8, the plane of the wall 72 being inclined in that direction about 10° with respect to a radius of drum 35 through the radially inner edge of the wall 72. The radially inner leg of each channel member is flush with the two radially inner edges of the annular members 60. The wall 72 of each channel member is also fitted with a lip piece 73 along its outer radial edge extending to the outer radial edges of its two end plates 70 and angled in the aforesaid direction of rotation. Hence the blades 71 closely sweep the entire space between the scoop plates 50 and 51 during rotation of the pickup assembly when the machine is in its loading position, the lips 73 of the blades 71 sequentially passing closely over the ground just forward of the lower end of the scoop plate 51. Thus manure scooped up by the latter is carried on the blades 71 up between the two plates 50 and 51 toward the loading-unloading opening 38. The end plates 70 function to keep manure from spilling off the ends of the blades 71 over the annular members 60 and the raised portions 47 of the side walls 43 serve to prevent the manure slipping out through the space between the drum wall 36 and the annular members 60. Only three blades 71 are preferably used in order that the pick-up assembly can be easily halted in a position, as shown in FIGS. 6 – 8, in which there is no blade 71 over the opening 38 to interfere with the unloading operation. The coil springs 55 permit the spacing between the upper ends of the scoop plates 50 and 51 to resiliently increase in order to prevent wedging of material between the scoop plate 51 and the blades 71.

Figure 4:
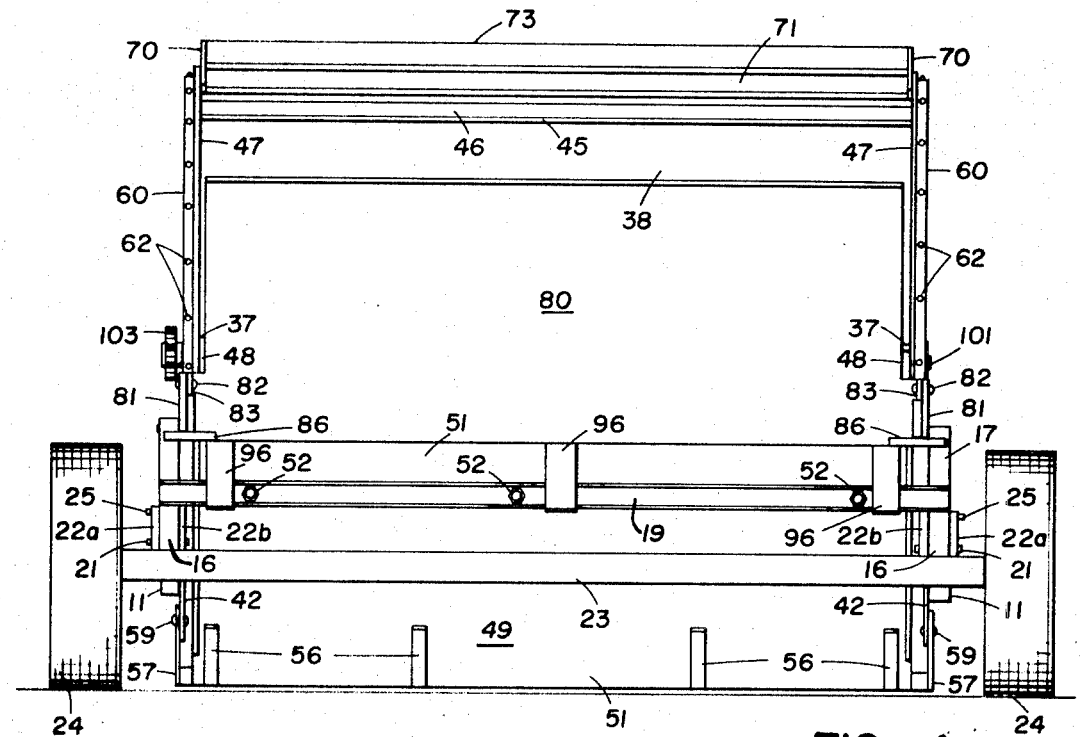
FIG. 4 is a rear elevational view of the machine of FIG. 1 in its loading position, the retaining plate control linkage being omitted for the sake of clarity.

The manure retaining plate 80, as noted, prevents the manure spilling over the outer radial edge of the lips 73 after the blades 71 have cleared the upper end of the scoop plate 51 and before they have reached a sufficient elevation and thus inclination over the loading-unloading opening 38 so that the manure will fall therefrom. The retaining plate 80 is generally concentric with the drum wall 36 and scoop plates 50 and 51 and extends from the upper end of the plate 51 up well over the loading-unloading opening 38, as shown in FIGS. 1, 4 and 5, when the machine is in the loading position. The linkage controlling the retaining plate 80 includes a pair of links 81 pivoted first at 82 to angle brackets 83 midway up the side edges of the plate 80 and then at 84 to the inboard faces of the rails 17. The lower corners of the baffle plate 80 are equipped with a pair of laterally projecting pintles 86 which engage the eyes 87 at the rear ends of a pair of arcuate bars 88 which slide through brackets 89 on the inboard faces of the suspension arm plates 22b and are fitted at their forward ends with spring cushioned stop assemblies 90. In the loading position shown in FIG. 1A, the brackets 89 and the stops 90 bias the lower end of the retaining plate 80 to the position illustrated where it is secured by a pair of hook plates 91 pivoted intermediate their ends at 92 to the inboard faces of the rails 17. The rear ends of the hook plates 91 are rounded and provided with notches so that they can ride up over and engage the pintles 86 outboard of the eyes 87, being biased to the latter position by means of extensible coil springs 93 connected between the rails 17 and the forward ends of the plates 91. To the latter ends of the hook plates 91 are also attached the upper ends of a pair of loosely hung cables 94 secured at their lower ends at 95 to the axle beam 23.

Accordingly, as the machine is moved to the transport-unloading position, whereby the upper ends of the suspension arms 22 swing upwardly and the axle beam 23 downwardly, the brackets 89 slide on the eye bars 88 and the cables 94 tighten until the hook plates 91 are pivoted aginst the springs 93 to release the pintles 86. The retaining plate 80 then drops downwardly of its own weight, guided by the links 81, until its upper edge lies atop the upper end of the scoop plate 50, all as shown in FIG. 6A, in order to expose the whole of the loading-unloading opening 38. When the machine is moved to its loading position, on the other hand, the brackets 89 engage the stops 90 of the eye bars 88 upon the downward movement of the upper ends of the suspension arms 22. Thus the lower end of the retaining plate 80 is pulled upwardly, guided by the links 81, until the hook plates 91 automatically latch over and re-engage the pintles 86 to secure the retaining plate 80 once again in the loading position shown in FIG. 1A. In order to help guide the retaining plate 80 during its movement, its lower end slides on a set of three downwardly turned guide plates 96 secured at their upper ends at spaced locations along the upper edge of the scoop plate 51.

Figure 9:
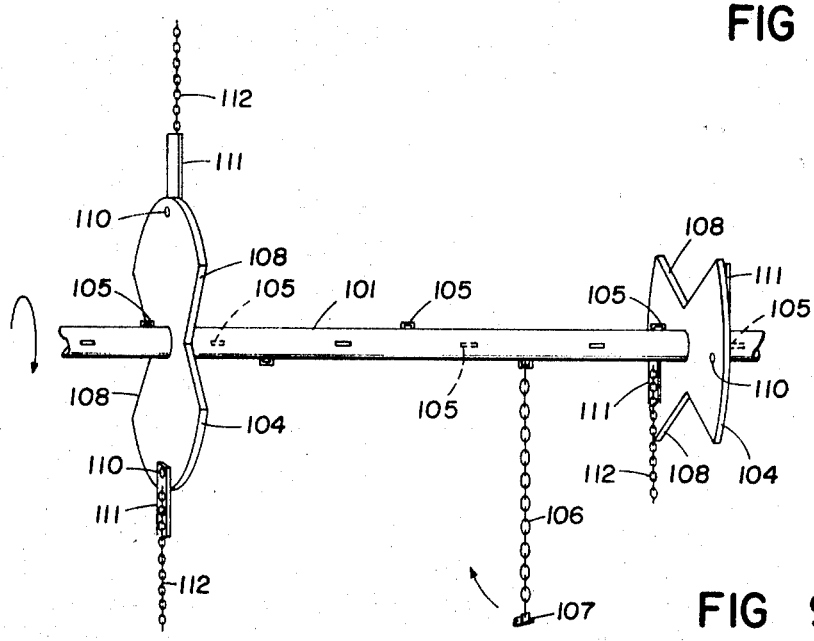
FIG. 9 is a partial view of the flail assembly shaft illustrating the two discs and the relative positions of the notches, swinging arms and flails thereon.

The flail assembly is carried on a shaft 101 suitably journaled as at 102 in the axis of the drum 35, one end of the shaft 101 being carried through an end wall 43 and fitted with a drive sprocket 103. One quarter the distance from each end of the shaft 101, a disc 104, approximately one-half the interior diameter of drum 35, is fixed to the shaft 101 for rotation therewith. To the latter are fixed a series of flail anchors 105 disposed thereon to form a helical pattern about the shaft 101, an anchor 105 being closely adjacent each side of the discs 104. To each anchor 105 in turn is attached the end of a flexible length of chain flail 106, only one being shown in FIGS. 8 and 9, having a weighted outer end 107, all as is customary in the art. Each disc 104 is provided with a pair of large diametrically opposite notches 108 extending in well toward the shaft 101, the included angle of the notches 108 being about 90° and bisected by a line through their apexes and the axis of shaft 101. The notches 108 should be extensive enough so that they effectively engage the manure and tend to fling it outwardly transversely of the shaft 101 as the latter rotates. As shown in FIGS. 5, 8 and 9, adjacent the rim of each disc 104 and its notches 108 is swingingly pivoted at 110 a pair of relatively short rigid arms 111 at diametrically opposite locations and on opposite sides of its disc 104, the location of the notches 108 and arms 111 of one disc being disposed 90° from those of the other disc 104 as shown in FIGS. 5 and 9. To each arm 111, in turn, is attached a short length of chain flail 112 adjacent its pivot 110. At their maximum extension from the discs 104 during rotation of shaft 101, the radius of the arcs of rotation of the outer ends of the flails 112 is the same as that of the outer ends 107 of the flails 106, that is, a bit less than the interior diameter of the drum 35.

To provide a mounting for the drive trains of the pickup and flail assemblies, a pair of vertical plates 120 are secured along and up from the inboard faces of the rails 11 at their forward ends. Just inboard of one plate 120 is mounted a suitable hydraulic motor 121 driven through hoses 122 connectable into a tractor's hydraulic system. The drive shaft of the motor 121 extends through the adjacent plate 120 and is fitted with a drive sprocket 123 which drives a larger sprocket 124, through a drive chain 125, fixed to the outer end of a transverse countershaft 126 journaled in the two plates 120. Inboard of the latter plates a pair of additional drive sprockets 127 are fixed to the shaft 126 from which drive chains 128 extend about the annular members 60 to engage the driving cogs 62 thereof. The drive chains 128 may be provided with suitable chain tighteners (not shown) if desired. Hence, as will be apparent, the motor 121 will positively rotate the pickup assembly about the drum walls 36 in the direction indicated, the motor 121 also serving later as a brake to retain the pick-up assembly in the unloading position shown in FIGS. 6 – 8. For a drum 35 five feet in diameter, a pickup assembly speed of about 15 to 25 revolutions per minutes has been found to give good results when three blades 71 are used. The lower speed is better for heavier, sticky manure while the upper one is better for soupier manure.

The flail assembly, on the other hand, is driven from the tractor's power take-off coupling through a shaft 130 which in turn drives a suitable gear box 131 mounted centrally along the cross rail 12 between the plates 120. A drive shaft 132 extends laterally from the gear box 131 and is journaled in the plate 120 on the same side of the machine as the drive sprocket 103 of the flail shaft 101. Outboard of the latter plate 120 the drive shaft 132 is fitted with a drive sprocket 133 from which a drive chain 134 extends about the sprocket 103, an adjustable idler sprocket 135 for the slack side of the drive chain 134 being provided on the adjacent drum side wall 43. Hence, when the drive shaft 130 is driven from the tractor, the flail shaft 101 will be rotated in the direction indicated. It will be understood, of course, that the pick-up and flail assemblies are not simultaneously driven but only alternately, depending upon whether the machine is loading or unloading.

After the drum 35 has been loaded with manure, the machine is raised to its transport-unloading position, and driven off to a field for unloading. When the drive to the flail assembly is engaged, initially the rigid arms 111 assume the positions shown at the right hand side of FIG. 9 in which they are folded back onto the discs 104, their flails 112 dangling in the manure while the other flails 106 wind themselves about the shaft 101. The notches 108 and the arms 111 begin to dig paths for the chain flails 106 immediately aside the discs 104 as the shaft 101 rotates. These flails in turn free the ones adjacent them and so forth, the locations of the discs 104 on the shaft 101 equally dividing up the task of freeing the flails 106 to each side of the discs 104, all as previously explained. The arms 111 and their flails 112 will break loose in the manure before the other flails 106 really become effective, this situation being that shown in FIG. 8, so that the arms 111 and their flails 112 perform most of the initial spreading operation. Eventually, the flails 106 come into maximum operation and together with the arms 111 and flails 112 become fully radially extended as indicated in FIGS. 5 and 9. Other details and aspects of the machine and its operation will be apparent to those skilled in the art.

Though the present invention has been described in detail in terms of a particular embodiment, being the best mode known of carrying out the invention, it is not limited to that embodiment alone. Instead, the following claims are to be read as encompassing all adaptations and modifications of the invention falling within the spirit and scope thereof.

I claim:

1. A combination manure loading and spreading machine comprising: a carriage for travel over the ground; a manure container supported by said carriage, said container including end walls and a peripheral wall therebetween extending laterally of said carriage and transversely to the normal direction of travel of said carriage over the ground, said container being movable between a lower manure loading position and an upper manure unloading position, the upper portion of said peripheral wall being apertured to provide for loading and unloading of manure; manure loading means associated with the exterior of said container including a pick-up assembly disposed for drivable movement about the exterior of said peripheral wall, said assembly having one or more loaders extending transversely of said end walls and spaced about said peripheral wall, and a scoop assembly extending transversely of said end walls in spaced relation to said peripheral wall to permit passage of said loaders between said scoop assembly and said peripheral wall during said pickup assembly movement, said scoop assembly floatingly engaging the ground when said container is in its loading position to collect manure therein during travel of said carriage in said direction, said loaders sequentially engaging said collected manure upon said assembly movement when said container is in its loading position to carry said collected manure from said scoop assembly to said loading aperture for dumping therein; manure unloading means associated with the interior of said container and drivable when said container is in its unloading position for positive expulsion of manure from said container through said unloading aperture and for spreading of same out over the ground; means for driving of each of said loading and unloading means independently of travel of said carriage over the ground; and means for moving said container between said loading and unloading positions.

2. The machine of claim 1 wherein said pickup assembly includes loader supporting members carried by said container adjacent said end walls and rotating about an axis to provide said assembly movement, said loaders comprising continuous members extending between and carried by said supporting members.

3. The machine of claim 2 wherein said loading aperture and said unloading aperture constitute a single opening over substantially the upper trailing quarter of said peripheral wall with respect to said direction of travel of said carriage, said scoop assembly extending about said container to said opening; and including means restraining spilling of manure from the radially outboard margins of said loaders during passage of said loaders from said scoop assembly over said opening.

4. The machine of claim 1 wherein the interior wall of said container is cylindrical in shape between said end walls; and wherein said unloading means includes a flail assembly disposed within said container between said end walls for rotation about the axis of said interior wall, said flail assembly having a plurality of elongated unloading members articulately secured at axially spaced locations along said assembly for rotation therewith, said unloading members gradually moving outwards of said assembly toward said cylindrical wall during rotation of said assembly in order to fling manure in said container out through said unloading aperture.

5. The machine of claim 4 wherein each of said unloading members comprises an elongated flexible member secured adjacent one end to said shaft; wherein said flail assembly includes a plurality of planar members fixed to said assembly at axially spaced locations therealong for rotation therewith, the plane of each of said planar members lying transversely of said axis, the axial distance between adjacent ones of said planar members being approximately twice the axial distance between said end walls and the respective planar members adjacent thereto; and wherein each of said planar members is provided with rigid members pivoted relative to said planar member on opposite planar sides thereof for swinging movement in a transverse plane with respect to said axis and for rotation with said assembly, each of said planar members having one of said flexible members disposed to each side thereof and closely axially adjacent thereto.

6. The machine of claim 5 wherein said rigid members are provided with flexible members having one end articulately secured thereto.

7. The machine of claim 6 wherein each of said planar members comprises a disc axially fixed on said shaft, said discs having cut-out portions extending from the rim thereof radially inwards toward said shaft effective to engage and throw manure in directions transversely outwardly with respect to said shaft during rotation of said flail assembly.

8. The machine of claim 1 wherein said container comprises a cylindrical drum and said pick-up assembly comprises a pair of annular shaped members concentrically disposed and rotating about the exterior of said peripheral wall adjacent said end walls, said manure loading drive means driving said annular members; and wherein each of said loaders comprises a continuous blade-like member having a manure lifting surface extending transversely of said peripheral wall and secured between said annular members substantially parallel to the axis of said drum.

9. The machine of claim 8 wherein said loading aperture and said unloading aperture constitute a single opening over substantially the upper trailing quarter of said peripheral wall with respect to said direction of travel of said carriage, said scoop assembly extending about said drum to said opening; and including a retaining plate disposed in trailing relation to said scoop assembly having an inner surface substantially in the path of travel of the outer radial margins of said loaders and extending from said scoop assembly to partially overlie said opening when said drum is in its loading position, said retaining plate being hinged for downward movement with respect to said drum to fully uncover said opening as said drum is moved to its unloading position, and means operatively interconnecting said retaining plate and said drum moving means to provide said retaining plate movement.

10. The machine of claim 9 wherein said unloading means includes a flail assembly disposed within said drum between said end walls for rotation in the axis of said drum, said flail assembly having a shaft with a plurality of elongated flexible members articulately secured at their inner ends at axially spaced locations along said shaft for rotation therewith, said flexible members gradually moving outwards of said assembly toward said peripheral wall in radial planes with respect to said axis during rotation of said assembly effective to fling manure in said drum out through said opening.

11. The machine of claim 10 including a plurality of discs disposed upon said shaft transversely thereof at axially spaced locations therealong, each of said discs having one of said flexible members disposed to each side thereof and closely axially adjacent thereto, the axial distance between adjacent ones of said discs being approximately twice the axial distance between said end walls and the respective discs adjacent thereto.

12. The machine of claim 11 wherein each of said discs is provided with rigid arms pivoted adjacent the rim of said disc at diametrically opposite locations thereon and on opposite sides thereof for swinging movement transversely of said shaft, and radially beyond the rim of said disc, the periphery of said disc being notched at diametrically opposite locations, said notches extending radially inwards substantially half the radius of said disc and effective to engage and throw manure toward said peripheral drum wall during rotation of said flail assembly.

13. The machine of claim 12 including flexible members articulately secured at one end to said rigid arms.

14. In manure spreading apparatus including a manure container and an assembly for unloading of manure therefrom, said container having end walls and a cylindrical wall therebetween with an unloading opening therein, said assembly being disposed in said container for drivable rotation in the axis of said cylindrical wall and having a plurality of elongated flexible unloading members articulately secured adjacent their respective inner ends relative to said assembly at axially spaced locations therealong for rotation therewith, said flexible members gradually swinging outwards from said assembly toward said cylindrical wall during said rotation in order to fling manure in said container out through said opening, the improvements in combination therewith comprising a plurality of fixed members secured to said assembly at axially spaced locations therealong for rotation therewith and extending transversely therefrom, the axial distance between adjacent ones of said fixed members being substantially twice the axial distance between said end walls and the respective fixed members adjacent thereto, some of said flexible members being disposed to the sides of said fixed members closely axially adjacent thereto.

15. The apparatus of claim 14 wherein each of said fixed members comprises a disc axially fixed on said assembly, said discs having notched portions in their peripheries extending radially inwards therefrom effective to engage and throw manure transversely outwards of said shaft during rotation of said assembly.

16. The apparatus of claim 15 wherein said discs include rigid members swingingly pivoted transversely of said axis adjacent the rims of said discs on opposite sides thereof, and flexible members articulately secured to said rigid members.

17. A combination manure loading and spreading machine for travel over the ground comprising: a manure loadable and unloadable container having a peripheral wall effective to hold and transport liquid and semi-liquid manure; manure loading means associated with said container for moving manure from the ground to within said container as said machine travels over the ground, said loading means including a manure elevating portion disposed for movement in a path surrounding the exterior of said peripheral wall and a ground engaging portion effective to substantially follow the contour of the ground and gather manure, said elevating portion being associated with said ground engaging portion so that said elevating portion receives the manure gathered by said ground engaging portion during said travel of said machine and thereafter elevates the manure and dumps the same into said container; and manure unloading means in addition to said loading means and associated with said container effective to positively expel manure therefrom.

18. The machine of claim 17 wherein said peripheral wall is disposed transversely of the direction of travel of said machine over the ground, said elevating portion being drivable about the exterior of said wall and having one or more elevating members extending transversely of said direction of travel and spaced about said peripheral wall, and including means for driving said elevating portion assembly independently of travel of said machine over the ground.

19. The machine of claim 18 wherein said container is movable between a lower manure loading position and an upper manure unloading position, said ground engaging portion contacting the ground when said container is in its loading position, and including means to move said container between said positions.

20. The machine of claim 18 wherein said container comprises a cylindrical drum having end walls, the cylindrical wall of said drum constituting said peripheral wall and the upper portion thereof being apertured to provide for loading and unloading of manure into and out of said drum, said elevating portion being carried on said drum by rotary means disposed adjacent each of said drum end walls, said elevating members extending between said rotary means and rotated thereby in a single direction about the entire circumferential extent of said cylindrical drum wall.

21. The machine of claim 20 wherein said ground engaging portion comprises scoop means disposed below said drum in spaced relation to said cylindrical drum wall, said elevating members passing between said scoop means and said cylindrical drum wall, said scoop means floatingly engaging the ground and collecting manure therein during travel of said machine in said direction, the direction of rotary movement of said elevating members about said cylindrical drum wall being effective to cause said elevating members to engage and elevate manure collected by said scoop means and thereafter dump the same into said drum through said manure loading aperture.

22. The machine of claim 22 including a wheeled carriage having said drum mounted thereon, said carriage being movable between a lower manure loading position in which said scoop means floatingly engages the ground as aforesaid and an upper manure unloading position in which said scoop means is out of contact with the ground.

* * * * *